(12) United States Patent
Tee et al.

(10) Patent No.: US 12,392,673 B2
(45) Date of Patent: Aug. 19, 2025

(54) COMPOSITE STRUCTURE FOR A PRESSURE SENSOR AND PRESSURE SENSOR

(71) Applicant: NATIONAL UNIVERSITY OF SINGAPORE, Singapore (SG)

(72) Inventors: Chee Keong Tee, Singapore (SG); Haicheng Yao, Singapore (SG); Pengju Li, Singapore (SG); Wen Cheng, Singapore (SG)

(73) Assignee: NATIONAL UNIVERSITY OF SINGAPORE, Singapore (SG)

( * ) Notice: Subject to any disclaimer, the term of this patent is extended or adjusted under 35 U.S.C. 154(b) by 409 days.

(21) Appl. No.: 17/618,258

(22) PCT Filed: Jun. 10, 2020

(86) PCT No.: PCT/SG2020/050325
§ 371 (c)(1),
(2) Date: Dec. 10, 2021

(87) PCT Pub. No.: WO2020/251473
PCT Pub. Date: Dec. 17, 2020

(65) Prior Publication Data
US 2022/0299385 A1    Sep. 22, 2022

(30) Foreign Application Priority Data
Jun. 10, 2019 (SG) .......................... 10201905267P

(51) Int. Cl.
*G01L 1/20* (2006.01)
*G01L 1/14* (2006.01)
(Continued)

(52) U.S. Cl.
CPC ............ *G01L 1/205* (2013.01); *G01L 1/146* (2013.01); *G01L 1/18* (2013.01); *G01L 5/228* (2013.01)

(58) Field of Classification Search
CPC . G01L 1/205; G01L 1/146; G01L 1/18; G01L 5/228
See application file for complete search history.

(56) References Cited

U.S. PATENT DOCUMENTS 11,112,318 B2 *  9/2021 Unyong ............... H10N 30/857
2018/0095580 A1  4/2018 Yi
(Continued)

FOREIGN PATENT DOCUMENTS

CN    104257367 B    1/2015
CN    104949779 A *  9/2015
(Continued)

OTHER PUBLICATIONS

CN-106017751-A, English Translation (Year: 2016).*
(Continued)

*Primary Examiner* — Ryan D Walsh
(74) *Attorney, Agent, or Firm* — Volpe Koenig

(57) ABSTRACT

A composite structure for a pressure sensor, a pressure sensor, a method of pressure sensing using the pressure sensor, and a method of fabricating a composite structure for a pressure sensor. The method of fabricating a composite structure for a pressure sensor comprises the steps of forming an array of microstructures made from an elastomeric material; and forming a flexible conductive coating on the array of microstructures such that a surface morphology of microstructures is substantially maintained for the coated array of the microstructures; wherein the conductive coating exhibits a Young's modulus that is higher than that of the elastomeric material.

20 Claims, 19 Drawing Sheets

(51) Int. Cl.
   *G01L 1/18*   (2006.01)
   *G01L 5/22*   (2006.01)

(56) References Cited

U.S. PATENT DOCUMENTS

| | | | |
|---|---|---|---|
| 2019/0040548 A1 | 2/2019 | Aitchison | |
| 2020/0081566 A1* | 3/2020 | Dahiya | G01L 5/228 |
| 2020/0149987 A1* | 5/2020 | Ahamed | B29C 37/0053 |
| 2022/0128420 A1* | 4/2022 | Tee | G01L 1/205 |
| 2022/0146340 A1* | 5/2022 | Arias | A43B 17/00 |
| 2022/0233124 A1* | 7/2022 | Connor | G06F 3/015 |

FOREIGN PATENT DOCUMENTS

| | | | | | |
|---|---|---|---|---|---|
| CN | 105067160 | B | | 11/2015 | |
| CN | 106017751 | A | * | 10/2016 | B81B 3/0021 |
| CN | 106595916 | A | | 4/2017 | |
| CN | 108007617 | A | * | 5/2018 | |
| CN | 108332887 | A | | 7/2018 | |
| CN | 108871629 | A | | 11/2018 | |
| CN | 108975266 | A | * | 12/2018 | A61B 5/0408 |
| CN | 109186817 | A | | 1/2019 | |
| CN | 108896215 | B | * | 11/2020 | G01L 1/18 |
| JP | 2019-506542 | A | | 3/2019 | |
| KR | 20150028125 | A | * | 3/2015 | |
| KR | 2018-0047432 | A | | 5/2018 | |
| WO | 2008/143012 | A1 | | 11/2008 | |
| WO | 2013/040636 | A1 | | 3/2013 | |
| WO | WO-2013109891 | A1 | * | 7/2013 | A61L 27/303 |
| WO | 2018/144772 | A1 | | 8/2018 | |
| WO | 2019/043499 | A1 | | 3/2019 | |

OTHER PUBLICATIONS

CN-108007617-A, English Translation (Year: 2018).*
CN-108896215-B, English Translation (Year: 2020).*
CN-108975266-A, English Translation (Year: 2018).*
KR-20150028125-A, English Translation (Year: 2015).*
CN-104949779-A English Translation (Year: 2015).*
WO-2013109891-A1 English Translation (Year: 2013).*
Journal: ACS Appl. Material & Interfaces; vol. 5, Issue: 19; pp. 9563-9571; Publication date: Sep. 9, 2013.
Communication: Nano Micro Small; vol. 10, Issue: 18; pp. 1-7; Publication date: Sep. 24, 2014.
Journal: ACS Nano; vol. 10, Issue: 8; pp. 7901-7906; Publication date: Jul. 27, 2016.
Journal: ACS Appl. Material & Interfaces; vol. 9, Issue: 28; pp. 24148-24154; Publication date: Jun. 21, 2017.
Journal of Microelectromechanical Systems; vol. 28, Issue: 1 pp. 154-163; Publication date: Nov. 26, 2018.
Zhu, B. et al. Microstructured graphene arrays for highly sensitive flexible tactile sensors. Small, Jun. 4, 2014, vol. 10, No. 18, pp. 3625-3631[Retrieved on Jul. 29, 2020] <DOI: 10.1002/SMLL.201401207>Figures 1-4.
Pang, Y. et al. Epidermis microstructure inspired graphene pressure sensor with random distributed spinosum for high sensitivity and large linearity. ACS Nano, Jan. 29, 2018, vol. 12, pp. 2346-2354 [Retrieved on Jul. 29, 2020] <DOI: 10.1021/ACSNANO.7B07613> Figures 1-5.
Sun, Q. et al. Fingertip-Skin-Inspired Highly Sensitive and Multi-functional Sensor with Hierarchically Structured Conductive Graphite / Polydimethylsiloxane Foams. 1808829, 1-11 (2019).
B. C. K. Tee, A. Chortos, R. R. Dunn, G. Schwartz, E. Eason, Z. Bao, Adv. Funct. Mater. 2014, 24, 5427.
Search Report issued in corresponding European Patent Application No. 20822209.1 on Jul. 12, 2022, consisting of 9 pp.
Notice of Refusal issued in corresponding Japanese Patent Application No. 2021-573505 on Mar. 29, 2024, consisting of 13 pp. (Machine Translation Provided).
Notice of Refusal issued in corresponding Japanese Patent Application No. 2021-573505 on Sep. 19, 2024, consisting of 13 pp. (Machine Translation Provided).

* cited by examiner

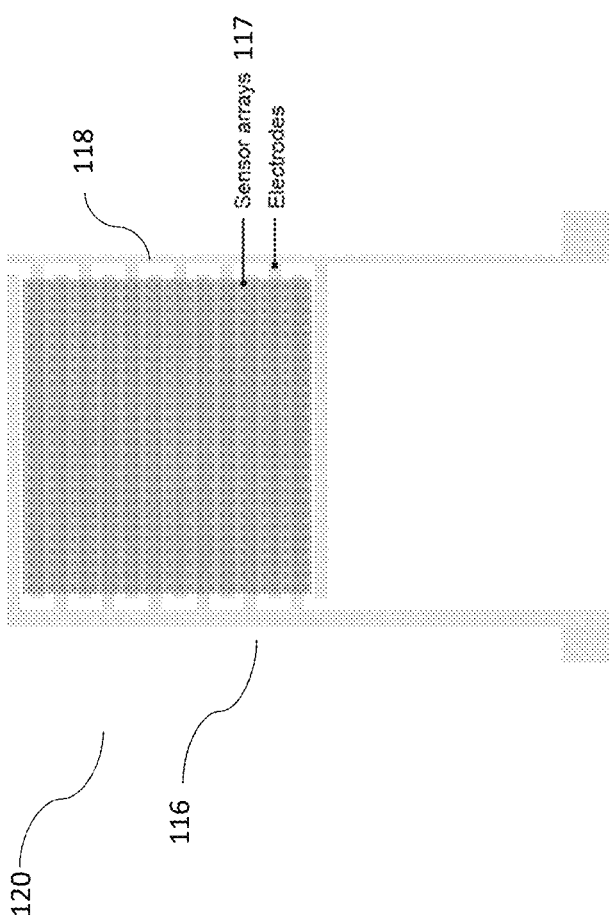
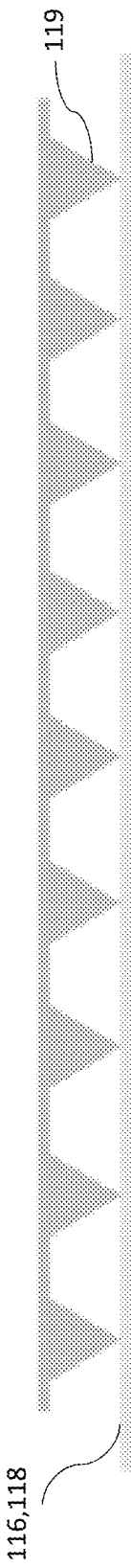

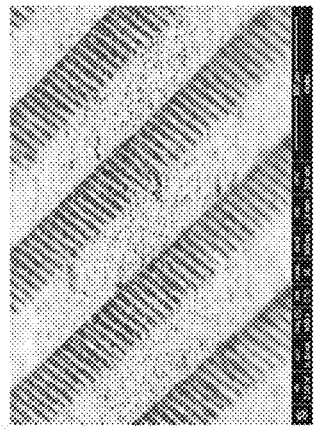
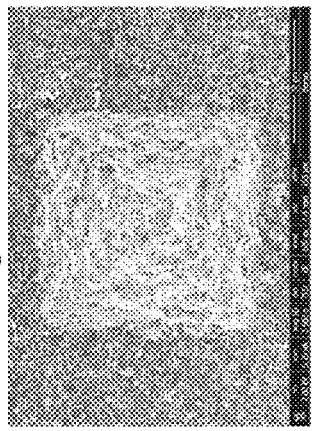
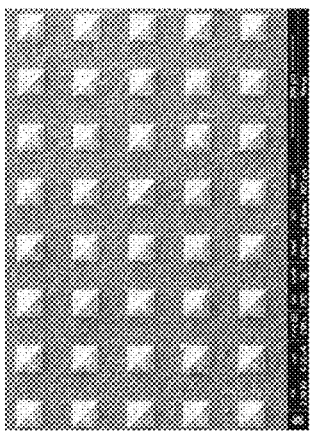
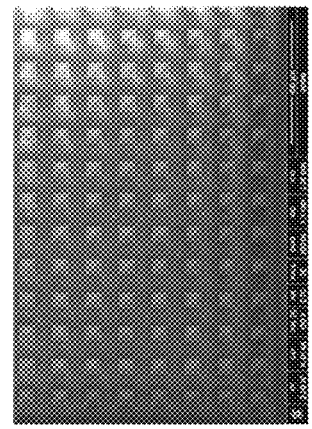
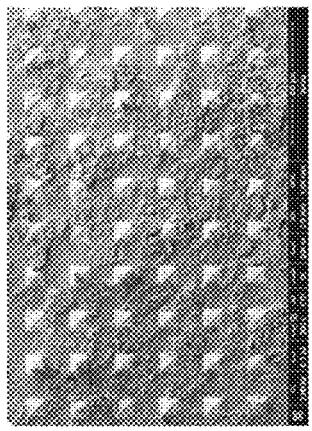
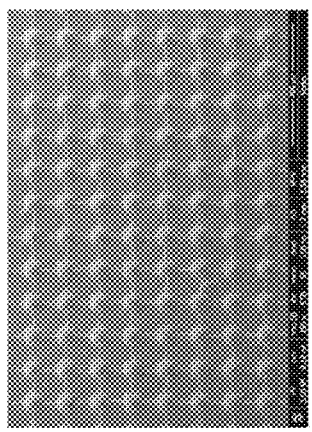
Fig. 2a  Fig. 2b  Fig. 2c  Fig. 2d  Fig. 2e  Fig. 2f  Fig. 2g

COMPOSITE STRUCTURE FOR A PRESSURE SENSOR AND PRESSURE SENSOR

FIELD OF INVENTION

The present invention relates broadly to a composite structure for a pressure sensor, to a pressure sensor, to a method of pressure sensing using the pressure sensor, and to a method of fabricating a composite structure for a pressure sensor.

BACKGROUND

Any mention and/or discussion of prior art throughout the specification should not be considered, in any way, as an admission that this prior art is well known or forms part of common general knowledge in the field.

Sun et al. utilized graphene and Polydimethylsiloxane (PDMS) to make a hierarchically structured sensor[1]. Graphite was mixed with PDMS and cubic sodium chloride (NaCl) first. After washing out the NaCl, a porous composite film was attained. By using sandpaper as a mold, the surface morphology of this composite can also be microstructured. The developed sensor can be used to detect pressure based on a piezoresistive working principle, which is common to many tactile sensors and generally measures change in resistance when pressure is applied.

However, the porous microstructures attained were irregular in the fabrication method in[1], and therefore the sensor is not adjustable to a desired performance for specific applications.

Embodiments of the present seeks to address at least one of the above problems.

SUMMARY

In accordance with a first aspect of the present invention, there is provided a composite structure for a pressure sensor, the composite structure comprising:
   an array of microstructures made from an elastomeric material; and
   a flexible conductive coating formed on the array of microstructures such that a surface morphology of the array of microstructures is substantially maintained for the coated array of the microstructures;
   wherein the conductive coating exhibits a Young's modulus that is higher than that of the elastomeric material.

In accordance with a second aspect of the present invention, there is provided a pressure sensor comprising the composite structure of the first aspect.

In accordance with a third aspect of the present invention, there is provided a method of fabricating a composite structure for a pressure sensor, the method comprising the steps of:
   forming an array of microstructures made from an elastomeric material; and forming a flexible conductive coating on the array of microstructures such that a surface morphology of microstructures is substantially maintained for the coated array of the microstructures;
   wherein the conductive coating exhibits a Young's modulus that is higher than that of the elastomeric material.

In accordance with a fourth aspect of the present invention, there is provided a method of pressure sensing using the pressure sensor of the second aspect.

BRIEF DESCRIPTION OF THE DRAWINGS

Embodiments of the invention will be better understood and readily apparent to one of ordinary skill in the art from the following written description, by way of example only, and in conjunction with the drawings, in which:

FIG. 1b shows a schematic top view illustrating microstructure/sensor arrays center-aligned on interdigital electrodes, according to an example embodiment.

FIG. 1c shows a schematic cross-sectional view of illustrating microstructure/sensor arrays center-aligned on interdigital electrodes, according to an example embodiment.

FIG. 2a shows an scanning electron microscope (SEM) image of as-prepared Gr-GO on polymer sample using a blading method for GO and supernatant Gr.

FIG. 2b shows another SEM image of as-prepared Gr-GO on polymer sample using a blading method for GO and supernatant Gr.

FIG. 2c shows another SEM image of as-prepared Gr-GO on polymer sample using a blading method for GO and supernatant Gr.

FIG. 2d shows an SEM image of as-prepared Gr-GO on polymer sample using bottom Gr.

FIG. 2e shows an SEM image of as-prepared Gr on polymer sample without the presence of GO layer.

FIG. 2f shows an SEM image of as-prepared Gr-GO on polymer sample with a thin layer of GO was coated by blading, according to an example embodiment.

FIG. 2g shows an SEM image of as-prepared Gr-GO on polymer sample with a thick layer of GO and buckles formed by drop casting of GO.

DETAILED DESCRIPTION

Figure 1A:
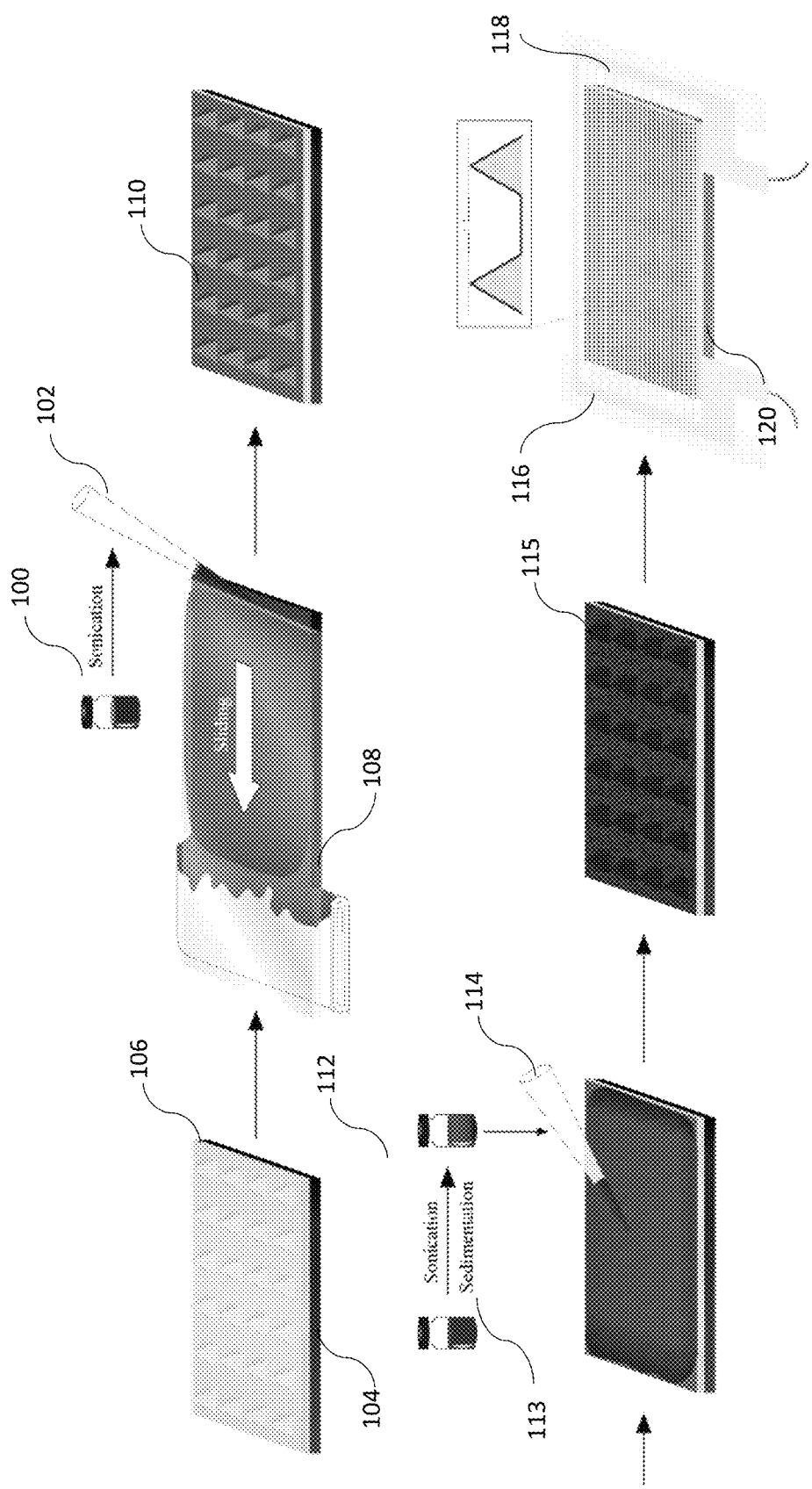
FIG. 1a shows a schematic illustration of the process to prepare Graphene/Graphene oxide layers on nanostructured PDMS film, according to an example embodiment.

Embodiments of the present invention provide a microstructured composite as a highly sensitive tactile sensor with attenuated viscosity in sensor performance. Embodiments of the present invention exploit the excellent deformability of a microstructured soft elastomer to attain high sensitivity and a wide sensitivity range. A stiff but flexible coating layer with both high Young's modulus (e.g. more than 10 times greater than that of the elastomeric microstructures) and flexibility, e.g. graphene, with a high Young's modulus up to 1 TPa, but also still flexible and stretchable, is designed on the surface of an elastomer according to example embodiments to reduce issues caused by viscoelastic effect. As a result, sensors according to example embodiments can achieve a high sensitivity of up to at least $10^6$ $\Omega \cdot kPa^{-1}$, with a wide detection range of 140 kPa in one example embodiment. Low hysteresis, temperature and strain rate independence are also observed. The sensors according to example embodiments are highly reliable and can maintain a consistent performance after a myriad of cycles, as well as after a long time. An analytical model is proposed to analyze the sensing mechanism of sensors according to example embodiments based on the change of contact resistance and quantum tunneling effect. The sensors according to example embodiments can be applied to detect small pressure (e.g. 8 Pa) and high-frequency signals (at least 1500 Hz).

Embodiments of the present invention use a more regular geometry of microstructures compared to a random geometry, with adjustable parameters, e.g. the size and density of micropyramids. Also, embodiments of the present invention use a structure based on the change of contact resistance, and utilize the high modulus (e.g. of at least 1 order of magnitude higher than the microstructures), and good flexibility of graphene (about 1 Tera Pascals) to achieve the viscosity reduced sensor performance.

Preparation of Microstructured PDMS Films According to Example Embodiments

Silicone elastomer and crosslinker were mixed at the weight ratio of 10:1, followed by rigorous mixing at the speed of 2500 rpms for 2 minutes. The mixture was spin-coated onto a non-stick layer treated (e,g, "Tosyl") silicon mold, which is patterned with micropyramid arrays with custom-designable sizes and spacing of each pyramid structure. For details of the patterning method used in example embodiments, reference is made to[2]. The sample was then degassed in a desiccator for 30 minutes to remove air bubbles generated during mixing. Polyethylene terephthalate (PET) was selected as the substrate and was treated with $O_2$ plasma to render the surface hydrophilic for better adhesion with PDMS. After degassing, the plasma treated substrate was pressed on top of the PDMS mixture on the mold, and cured at 80° C. for at least 4 hours. Finally, the mold was peeled off and the microstructured PDMS films remained on the substrate for further testing.

Fabrication of Graphene/Graphene Oxide Layers on the Microstructured PDMS Film

FIG. 1a shows a schematic illustration of the process to prepare Graphene/Graphene oxide layers on nanostructured PDMS film, according to an example embodiment.

Specifically, FIG. 1a provides a schematic depiction for sample preparation according to an example embodiment. Graphene oxide (GO) can be easily dispersed in water (e.g. 10 mg/ml) by ultrasonication for 1 hour, indicated at numeral 100, and the quality of the dispersion can be well-maintained for a long time without aggregation and precipitation. The GO was then transferred, indicated at numeral 102, onto the $O_2$ plasma treated elastomer, here PET, substrate 104 with microstructured PDMS 106, followed by blading, indicated at numeral 108, for more even deposition and to remove excess GO, which contributed to a uniform GO layer 110.

Figure 10:
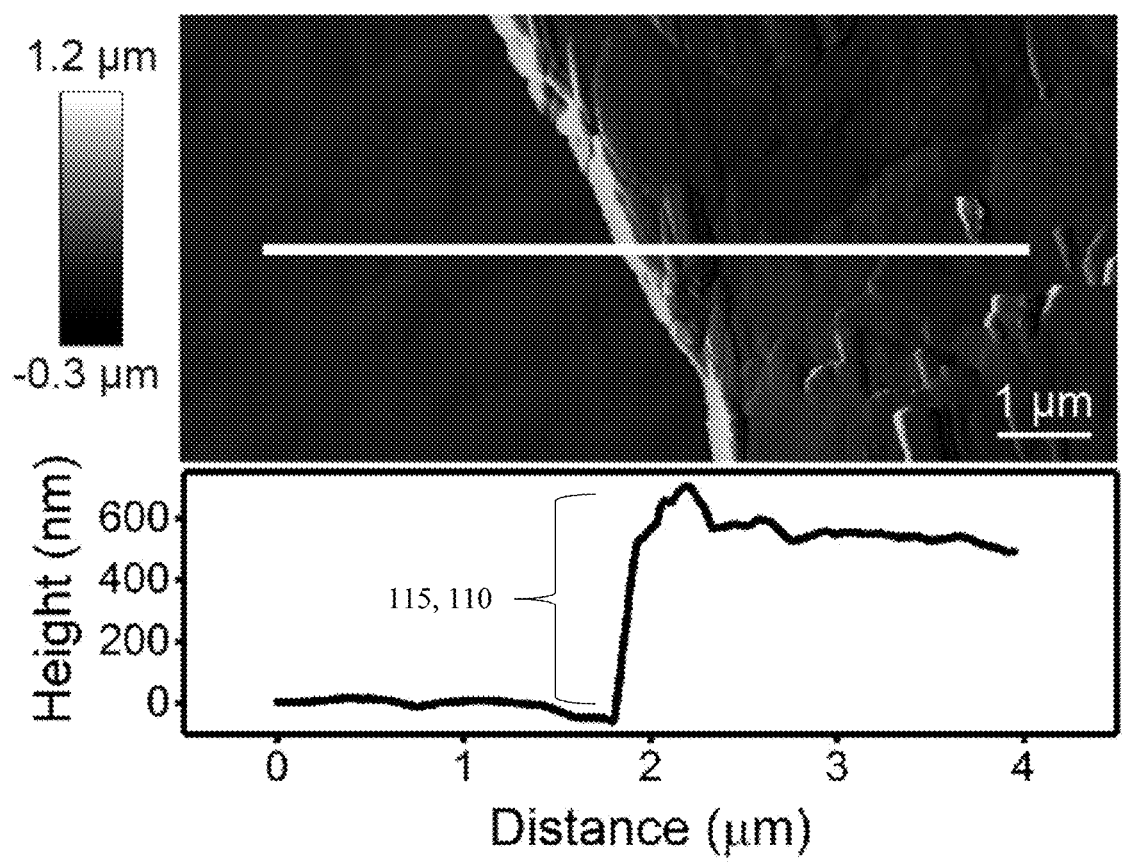
FIG. 10 shows an atomic force microscopy (AFM) image of the edge of a Gr nanoflakes uniform layer for use in a composite structure according to an example embodiment.

The nanographene (Gr) powders were firstly dispersed in N-Methyl-2-pyrrolidone (NMP) solution (10 mg/ml), followed by ultrasonication of 2 hours, indicated at numeral 112. The choice of a concentration of 10 mg/ml according to preferred example embodiments will be described below. A one-hour sedimentation process, indicated at numeral 113, was used after the ultrasonication, which allowed unevenly dispersed Gr to gravitate from the top layer, while the finely dispersed supernatant Gr nanoflakes were drop casted, indicated at numeral 114, onto the GO layer 110 and dried in an 80° C. oven for 30 minutes to form a uniform flexible conductive Gr coating 115. FIG. 10 shows an atomic force microscopy (AFM) image of the edge of the Gr coating 115 and the intermediate GO layer 110, indicating a total height of about 600 nm according to an example embodiment.

It is noted that when using NMP as in the method described above according to an example embodiment, the substrate of the sensor preferably does not react with NMP, e.g. PET film was used in the embodiments described herein. NMP can be replaced in other embodiments to extend the range of substrates.

FIG. 2 shows SEM images of as-prepared Gr-GO on polymer sample (a)-(c) using the blading method described above for GO and supernatant Gr, (d) using bottom Gr, (e) without the presence of GO layer, (f) a thin layer of GO was coated by the blading method described above, (g) a thick layer of GO and buckles were formed by drop casting of GO.

Specifically, FIGS. 2a to 2c show the SEM images of the microstructured composite. There are some key factors that can affect the quality of the composite structure according to example embodiments. Firstly, after sedimentation, if bottom Gr was used for drop casting, the coating was found to be uneven and so dense that it covers all the microstructures that are responsible for sensitivity, and can be easily delaminated when pressure is applied, as can be seen from the SEM image in FIG. 2d. Secondly, if no GO layer is present, the Gr nanoflakes tend to aggregate and the deposition will be non-uniform, as can be seen in the SEM image in FIG. 2e. It is believed that the thin GO layer, serving as an interface layer between the polymer and Gr, provides better affinity to Gr mainly due to π-π interaction and contributes to the formation of a Gr layer with better uniformity, according to preferred embodiments. Furthermore, the thickness of the GO layer is preferably controlled. FIGS. 2f and 2g show a GO on PDMS sample prepared by blading and drop-casting, respectively. As can be seen from the SEM images in FIGS. 2f and 2g, the GO layer coated by blading according to preferred embodiments was sufficiently thin to maintain the surface morphology of microstructured PDMS, while the drop-casted GO significantly changed the original microstructure, leaving air gaps at the side edges of the micropyramids and also buckles. Therefore, in order to form high-quality Gr-GO layers on PDMS microstructures, it is preferred to use supernatant Gr and blading coated GO.

Improvement on the Adhesion Between GO and PDMS According to Example Embodiments In embodiments which allow GO to interact with PDMS only through Van Der Waals force, the film may be detached if strong shear, bending or adhesive forces are presented. Several methods can be implemented according to preferred embodiments to improve the adhesion between GO and PDMS. One method can be sputtering of thin-layer copper on PDMS, followed by GO deposition and annealing at 120° C. for 2 hours, which contributed to the formation of chemical bonds between copper and GO to enhance the adhesion strength. Another method focuses on the electrostatic interaction. As GO is negatively charged, a surface treatment can be conducted on the PDMS surface to render it positively charged. This strategy can generate a strong electrostatic force between GO and PDMS to greatly enhance the adhesion.

Variation of Materials for Pressure Sensitive Composite According to Various Embodiments The present invention is not limited to the materials used in the example embodiments described above.

In various embodiments, the present invention can, for example, be also applied to other low-dimensional electronically active material systems for the flexible conductive coating such as, but not limited to, coatings made from other carbon allotropes such as graphyne and other added 2D materials such as borophene, tungsten selenide, silicene, etc. These active 2D materials can be dispersed in suitable dispersants and coated on the surface of elastomeric microstructures using the same method described above with reference to FIG. 1a. The conductive path formed on the elastomer surface can lead to the change of resistance when the pressure is applied.

Other elastomeric materials can include, but are not limited to, other polymers e.g. (styrene-ethylene-butylene-styrene) (SBS), silicones and polyurethanes, which provide a wide range of selective mechanical performances for various requirements.

Sensor Characterization According to Example Embodiments

Elastomers usually exhibit good deformability because of their low elastic moduli, which benefits in designing pressure sensitive elements. On the other hand, their performances are strongly affected by viscoelastic effects, e.g. hysteresis. However, the sensor according to example embodiments can advantageously utilize the properties of an outer graphene layer to reduce prohibitive viscoelastic effects and instead exhibit low hysteresis, weak temperature dependence, and weak strain-rate dependence without sacrificing sensing performances (e.g. high sensitivity, wide sensitive range). Based on the contact resistance change as the principal sensing mechanism, the electrical performances of the sensors according to example embodiments highly depend on the pressure response of the outer layer. Thus, the issues associated with viscosity can be compensated by the graphene coating according to example embodiments, which exhibit more elastic properties. The characterization of sensors according to example embodiments demonstrated the reduced viscoelastic effects, and are described below.

In the example embodiment characterized below, each micropyramid has a basal size of 50 μm and a height of 35.3 μm. The spacing of two pyramids is 50 μm. It is noted that the present invention is not limited to those sizes.

The thickness of graphene layer is 450 nm and the thickness of graphene oxide layer is 150 nm. It is noted that the present invention is not limited to those thicknesses and materials.

For characterization, the composite according to example embodiments was assembled with designed interdigital electrodes 116, 118 formed on a substrate (not shown) surface opposing the coated microstructures as the graphene sensor 120 according to an example embodiment, see FIGS. 1a to 1c.

Specifically, the microstructure/sensor arrays 117 were center-aligned on the interdigital electrodes 116, 118 (see FIG. 1b and FIG. 1c) with the coated pyramid tips 119, in this embodiment, facing down to contact with the electrodes 116, 118. A commercial Biocompatible tape can be used to seal the sensor arrays on the electrodes 116, 118.

In one example embodiment, the interdigital electrodes 116, 118 were fabricated using a standard lithography process. A photoresist was coated on the substrate and exposed to the UV light under a photomask. The photomask has the interdigital electrodes patterns, which were transferred to the photoresist after developing it. Then titanium (Ti) and gold (Au) were sputtered onto the photoresist. After the lift-off, the excess photoresist and metals were washed out with the interdigital-patterned metals left on the substrate as the electrodes.

The designed interdigital electrodes 116, 118 cover a slightly larger area than the sensor itself for a more robust performance according to an example embodiment, which will be discussed in the theoretical analysis section below, as schematically shown in FIG. 1b. When the compressive pressure (140 kPa) was applied on the sensor using a custom-designed linear stage system with a strain rate of 5 µm/s, the resistance changed from the order of $10^6 \Omega$ to the order of $10^1 \Omega$.

Figure 3B:
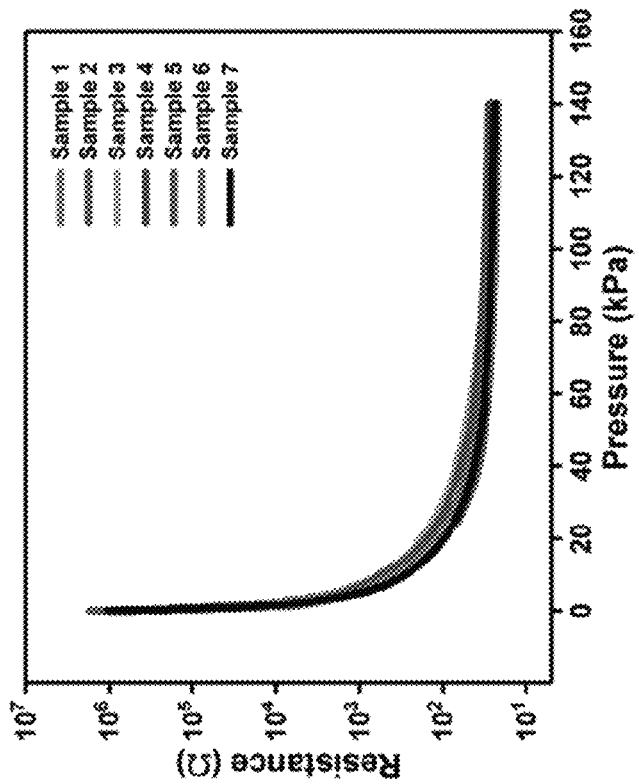
FIG. 3b shows pressure responses of graphene sensors according to various embodiments.
Figure 3A:
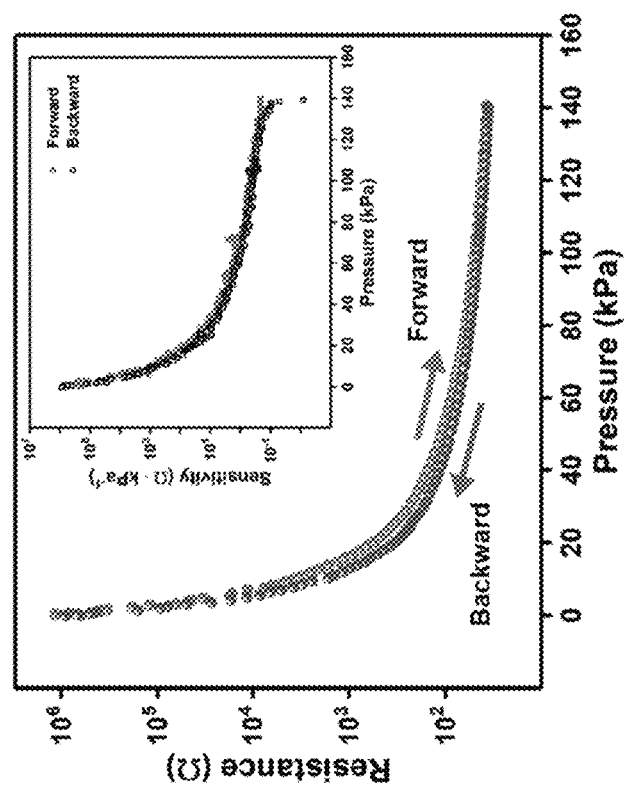
FIG. 3a shows a graph of resistance versus pressure of graphene sensors according to an example embodiment, forward and backward response. The inset graph shows the relationship of sensitivity versus pressure.
Figure 3C:
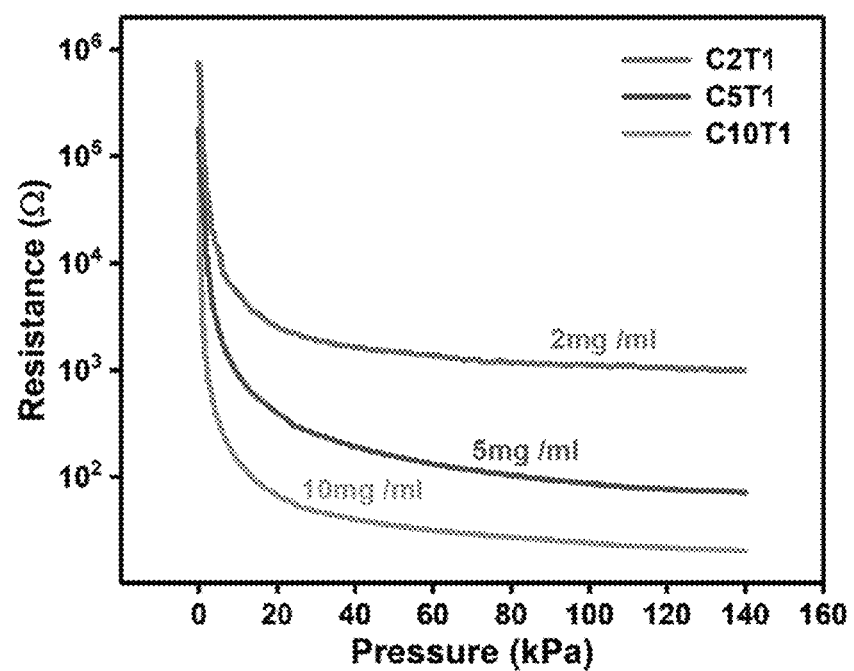
FIG. 3c shows a graph illustrating the effect of Gr concentrations on tunable pressure responses according to example embodiments.

FIG. 3 Shows a graph of resistance versus pressure of graphene sensors according to example embodiments: FIG. 3a Forward and backward response. The inset graph shows the relationship of sensitivity versus pressure. FIG. 3b Pressure responses of graphene sensors according to various embodiments. FIG. 3c The effect of Gr concentrations on tunable pressure responses according to example embodiments.

Specifically, FIG. 3a shows the resistance change corresponding to the applied pressure according to an example embodiment. Both loading and unloading results are indicated. Only a small electrical hysteresis was observed compared to previously reported piezoresistive sensors, showing great potential for accurate sensing applications. This reduced hysteresis is attributed to the high modulus of the graphene coating according to example embodiments, which advantageously imparts more elastic properties on the sensors.

The inset graph in FIG. 3a shows the relationship between pressure and sensitivity. The definition of sensitivity is $s=\delta R/\delta P$, referring to the resistance change within a very small change of the pressure. The sensitivity of the graphene sensor according to example embodiments can go up to at least $10^6 \ \Omega \cdot kPa^{-1}$ when the applied pressure is small, indicating a good ability to detect the minute force. When the pressure increases, the sensitivity will decrease as expected. As the pressure-sensitivity curve can be attained from the differentiate of the pressure-resistance curve through the definition of sensitivity, the smooth and consistent relationship of sensitivity versus pressure shows the stability of sensor performance according to example embodiments. FIG. 3b shows the electrical pressure responses of multiple graphene sensors according to example embodiments, indicated as samples 1 to 7. The comparable results indicate the reliability of the fabrication methods and resulting sensors according to example embodiments. Furthermore, the Gr concentration used for coating was found to be a key factor that affects the pressure response of the sensor. According to example embodiments, sensor performance can be adjusted by tuning the concentration of Gr. As shown in FIG. 3c, "C10T1" (meaning 10 mg/ml in concentration and one single coating) presents the largest sensitivity range compared with "C5T1" and "C2T1" (meaning 5 mg/ml and 2 mg/ml respectively, in concentration and single coating), according to various example embodiments.

Figure 4B:
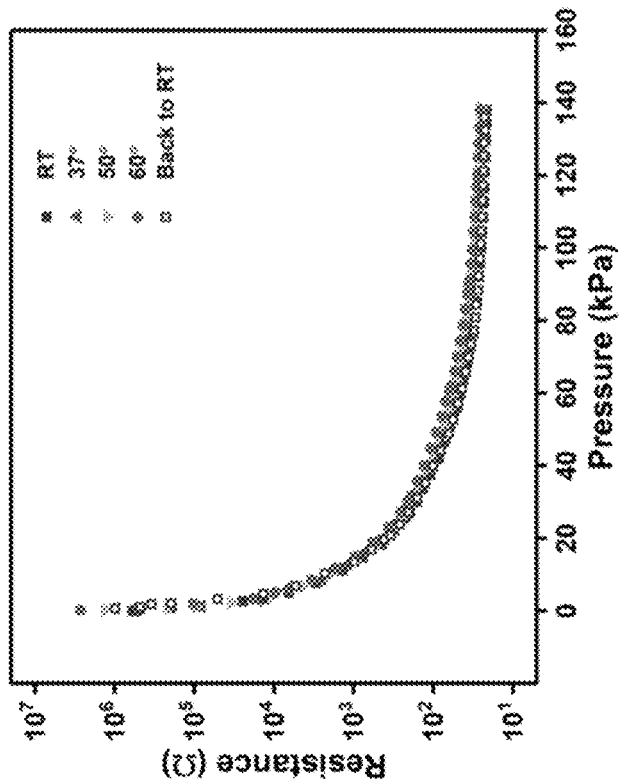
FIG. 4b shows a graph illustrating the temperature independence of graphene sensors according to example embodiments. The pressure response shows an insignificant change when the temperature increases from the room temperature to 60° C.
Figure 4A:
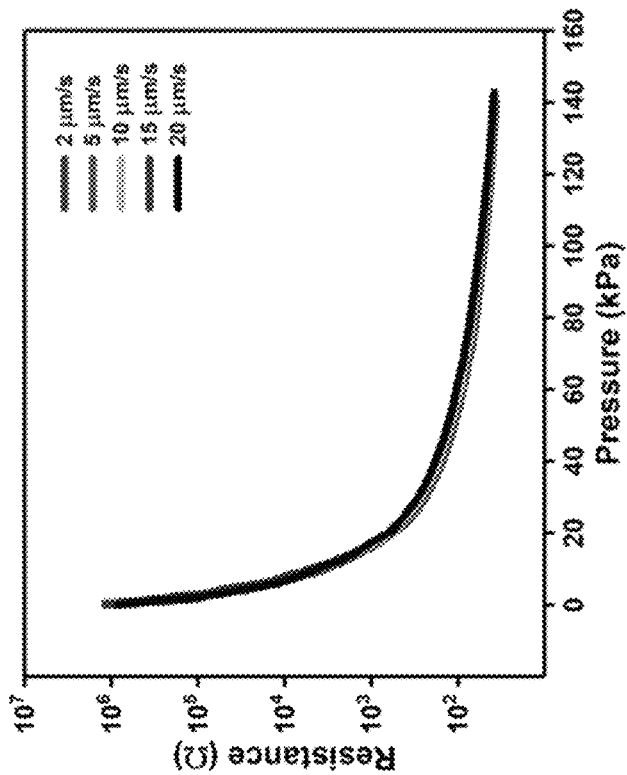
FIG. 4a shows a graph illustrating the strain rate independence of graphene sensors according to example embodiments. The pressure responses are identical at different strain rates.

FIG. 4a shows a graph illustrating the strain rate independence of graphene sensors according to example embodiments. The pressure responses are identical at different strain rates. FIG. 4b shows a graph illustrating the temperature independence of graphene sensors according to example embodiments. The pressure response shows an insignificant change when the temperature increases from the room temperature to 60° C.

For viscoelastic materials such as PDMS, the relationship between the load and response is a function of frequency because its viscous effect obeys Newton's law. When the pressure is applied at different strain rates, the corresponding response of PDMS is expected to be different. However, due to the flexibility and high modulus, the graphene layer coated at the outside according to example embodiments can make itself easily deform with the inner PDMS while mainly exhibiting elastic properties, which refers to the obedience of Hooke's law. According to example embodiments, the contact area between the electrodes and graphene layer is not visibly affected by the frequency, leading to a strain-rate independent resistance change of the sensor upon applied loads. FIG. 4a illustrates that the electrical responses of the graphene sensors according to example embodiments are almost identical at different strain rates. The result shows that sensors according to example embodiments can work reliably with loads applied at various frequencies, which also indicates the sensors according to example embodiments have great potential to detect vibrations. This will be described below in more detail.

For the effect of temperature, graphene has a much smaller thermal expansion coefficient compared with PDMS when the temperature increases, which can advantageously reduce the shift of sensor response induced by the geometric expansion of the sensor structure during temperature change. On the other hand, the temperature coefficient of resistivity (TCR) of graphene is extremely small, which indicates the resistivity of graphene is dominated by impurities and changes slowly with temperature. These two reasons contribute to the minimal temperature dependence of the graphene sensors according to example embodiments (see FIG. 4b), compared with previously reported work. The performances of existing sensors are highly dependent on temperature, whereas the sensors according to example embodiments can advantageously work more reliably regardless of the temperature change, which indicates stronger robustness at different working conditions.

FIG. 5 Shows graphs illustrating the reliability of graphene sensors according to example embodiments when subjected to cyclic compressions and long period of time: FIG. 5a The pressure response from the $1^{st}$ cycle to the $1,000,000^{th}$ cycle. FIG. 5b The loading and unloading responses after 1,000,000 cycles, showing that the hysteresis still remains at only a low extent. FIG. 5c Continuous measurement of sensor performance over 1000 cycles. FIG. 5d The loading and unloading responses of a graphene sensor according to an example embodiment after 8 weeks from fabrication, showing the good reliability of the sensors according to example embodiments over days.

Figure 5B:
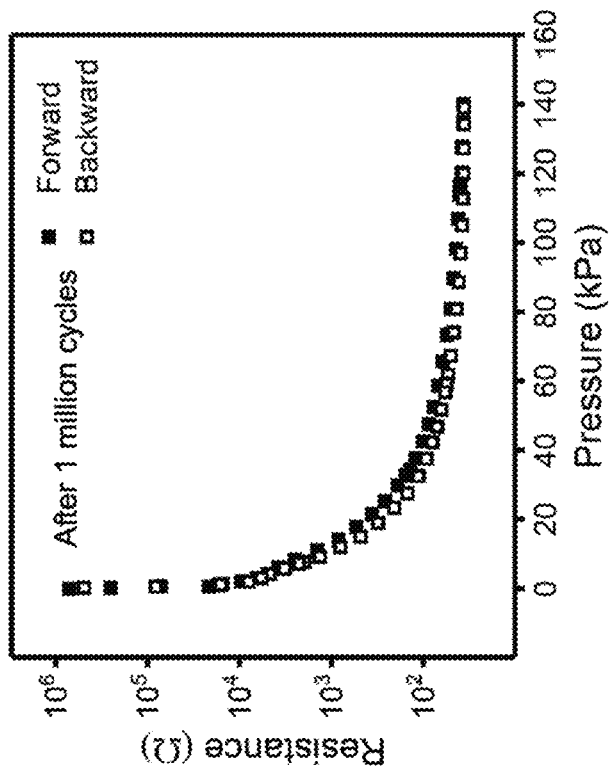
FIG. 5b shows the loading and unloading responses of a sensor according to an example embodiment after 10000 cycles, showing that the hysteresis still remains at only a low extent.
Figure 5A:
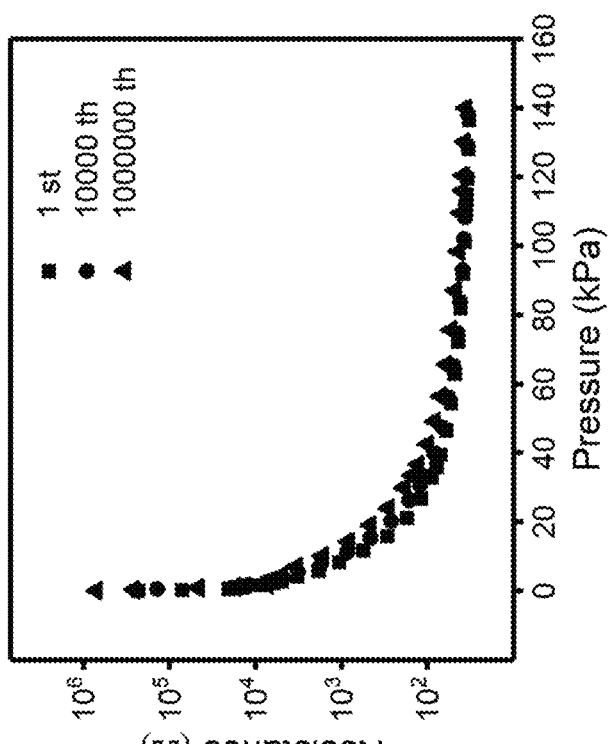
FIG. 5a shows a graph illustrating the pressure response of a sensor according to an example embodiment from the $1^{st}$ cycle to the $10000^{th}$ cycle.

Specifically, to characterize the sensor reliability during cyclic loads, the graphene sensors according to example embodiments were subjected to a cyclic pressure of 140 kPa for 1,000,000 times. FIG. 5a presents the corresponding sensor performances from the 1st cycle to the 1,000,000th cycle. Both sensitivity and sensitive range remained stable and consistent after 1,000,000 cycles. The mostly comparable sensor responses before and after 1,000,000 times of compression indicate the good reliability and compressibility of the graphene sensor. The slight shift of resistance observed especially during the first 100 cycles may be induced by a more compact contact between various graphene flakes of the coating layer. This circumstance also appears in FIG. 5c and the quantum tunneling phenomenon arisen by these uncompact graphene flakes will be discussed below. The loading and unloading responses of a graphene sensor according to an example embodiment were plotted at the $1,000,000^{th}$ compression in FIG. 5b. The low hysteresis is still maintained after a myriad of cycles, showing a reliable performance and high accuracy of the sensors according to example embodiments. In addition, the good adhesion between Gr-GO and PDMS according to example embodiments was also revealed and the outer layer would not be degraded or damaged after the myriad of cycles, by virtue of its unique flexibility. Furthermore, FIG. 5c displays the continuous measurement results of sensor responses over the first 1000 cycles of compression. During the loading with constant amplitude (140 kPa), the maximum conductance of the sensor slightly increased first, due to a more compact stack of graphene flakes. Later, it remained unvaried and stable over cycles. A good sensor reliability is illustrated from the characterization results.

Figure 5D:
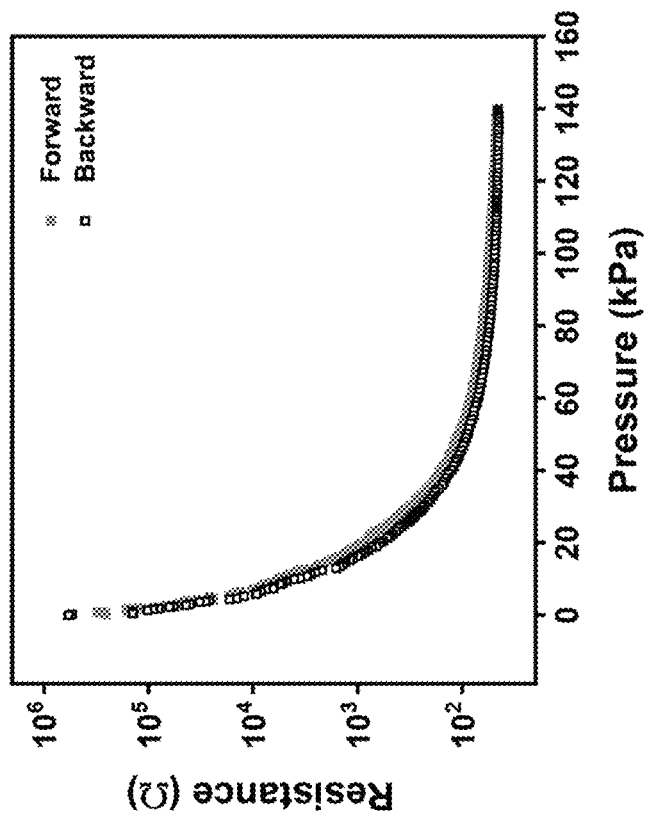
FIG. 5d shows the loading and unloading responses of a graphene sensor according to an example embodiment after 8 weeks from fabrication.
Figure 5C:
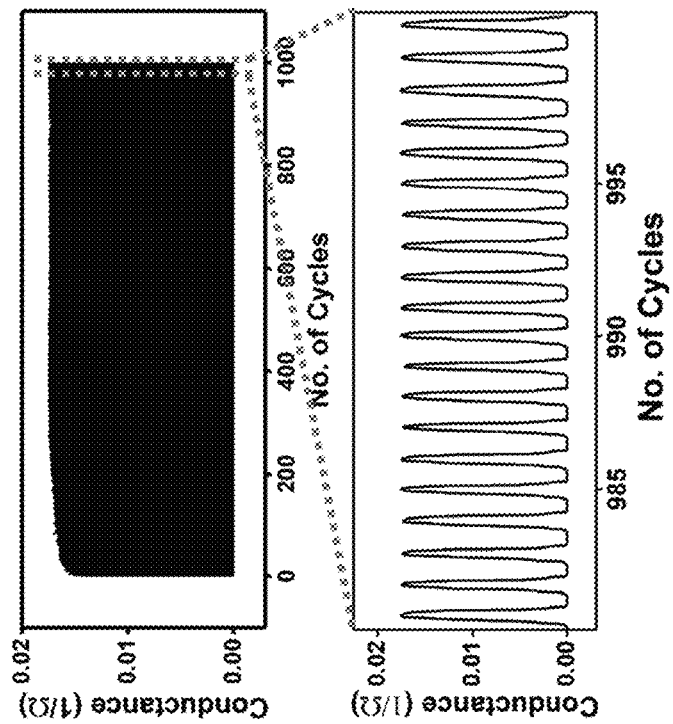
FIG. 5c shows continuous measurement of sensor performance of a sensor according to an example embodiment over 1000 cycles.

In previous work studying PEDOT:PSS coated microstructured sensors, the sensor performance would degrade with time and became less sensitive. The reason for the degradation is because the PSS part will react with water and lead to the degeneracy. However, graphene is highly inert and can advantageously work as a corrosion barrier against water and oxygen diffusion. In this case, the sensor coated with Gr-GO according to example embodiments can maintain its sensing ability even after a long period of time. FIG. 5d illustrates the pressure responses (both loading and unloading) of a graphene sensor according to an example embodiment after 8 weeks from fabrication. Good sensitivity, wide sensitive range and low hysteresis are still exhibited without degradation. This property is significant for the use of sensors according to example embodiment in applications like wearable devices and health monitoring system.

Interdigital Electrodes According to Example Embodiment

Figure 6A:
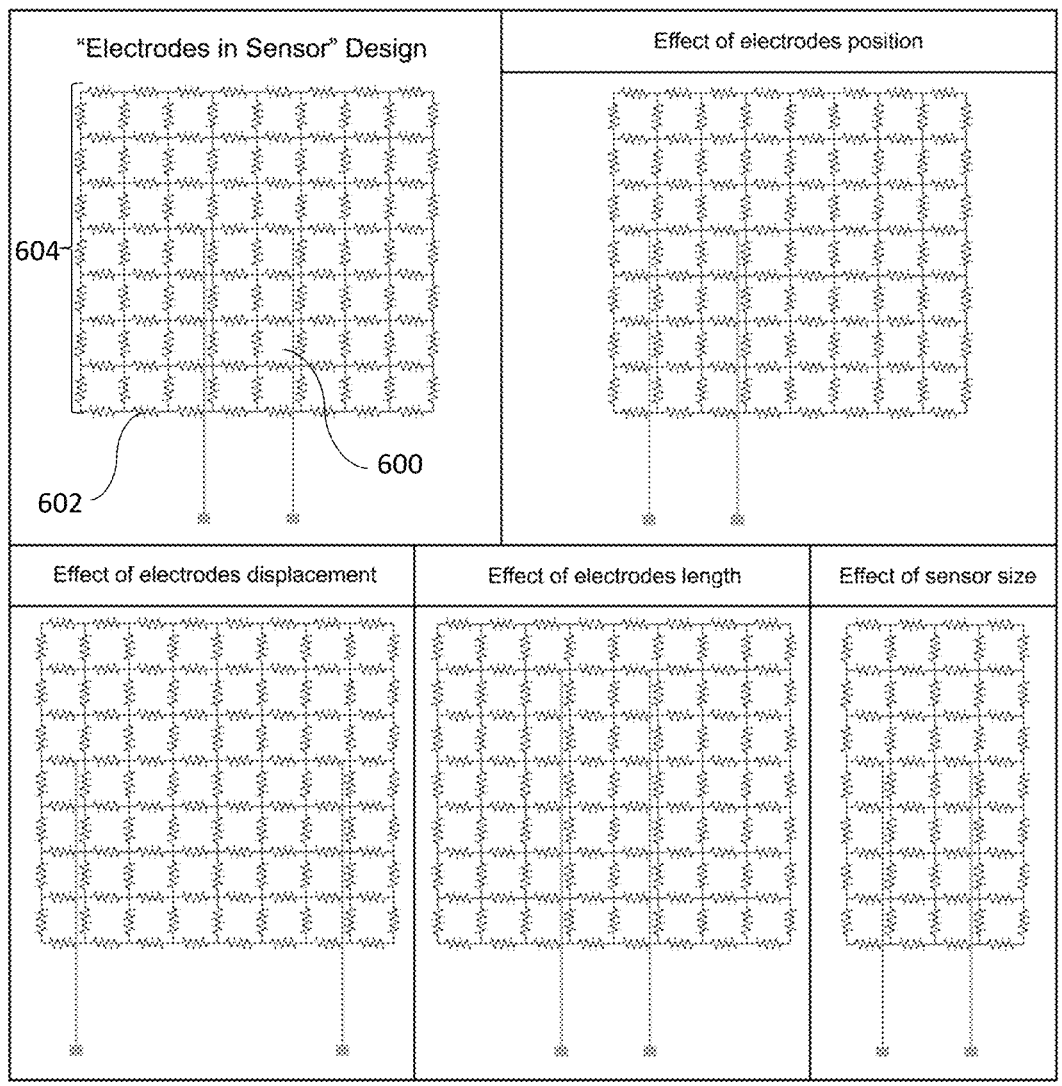
FIG. 6a shows schematic drawings illustrating simulation of the equivalent surface resistance of graphene sensors according to example embodiments, with "electrodes in sensor" design.
Figure 6B:
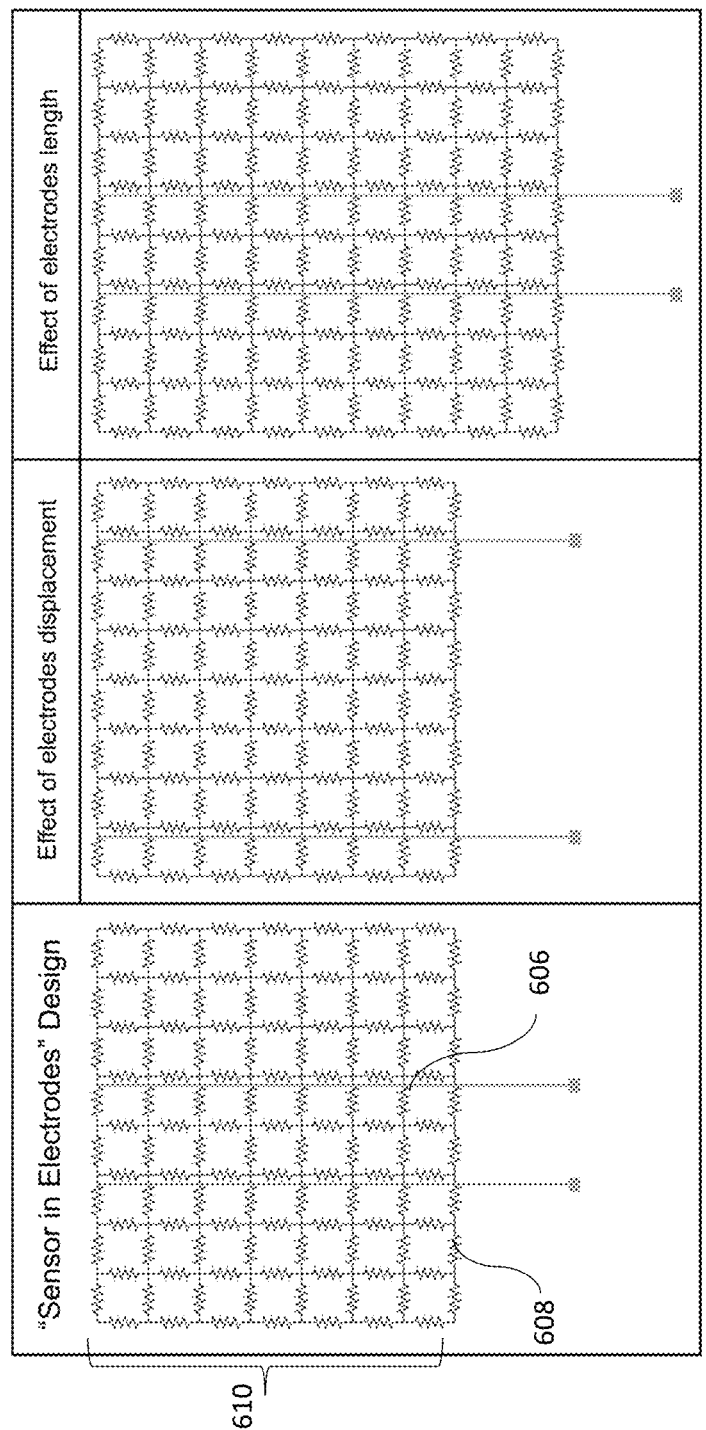
FIG. 6b shows schematic drawings illustrating simulation of the equivalent surface resistance of graphene sensors according to example embodiments, with "sensor in electrodes" design.
Figure 7A:
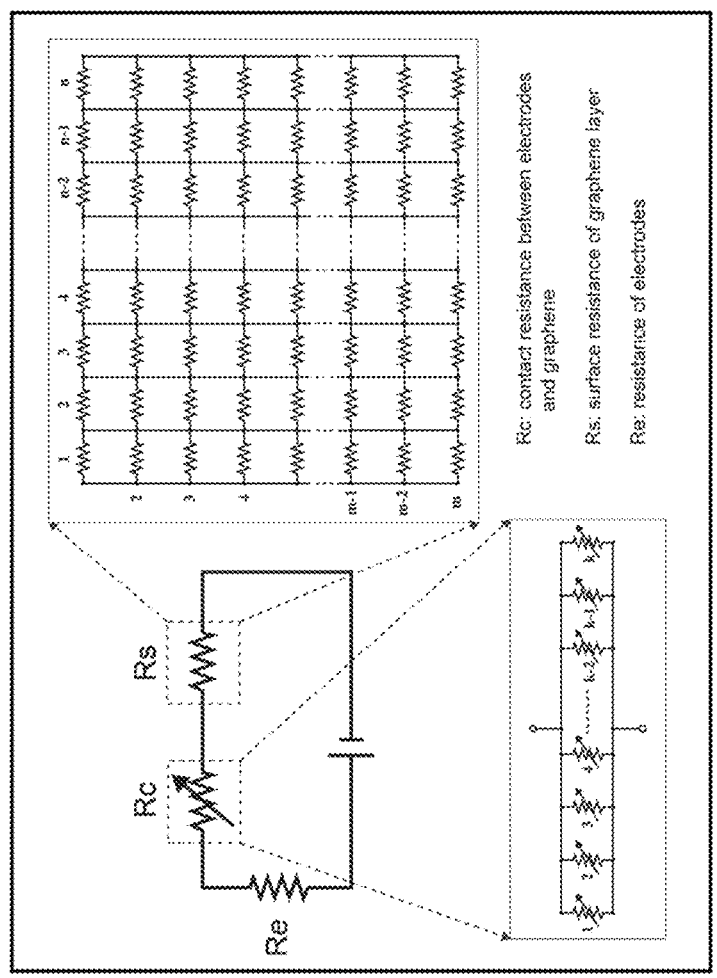
FIG. 7a shows a schematic of the equivalent circuits of graphene sensor according to example embodiments.

FIG. 6 shows schematic drawings illustrating simulation of the equivalent surface resistance of graphene sensors according to example embodiments, with FIG. 6a "electrodes in sensor" design, and FIG. 6b "sensor in electrodes" design. FIG. 7a shows a schematic of the equivalent circuits of graphene sensor according to example embodiments.

The reason for utilizing interdigital electrodes according to preferred example embodiments is to increase the contact area between sensor and electrodes, and to reduce the effect of possible unevenly distributed coating defects. When the current passes through the surface of the micropyramids according to some example embodiments, each structure with Gr-GO coating can be regarded as one resistor. The equivalent circuit of an array of micropyramids is lots of resistors in series and in parallel connection. The software TINA was utilized for modeling and analyzing the resistance of this circuit (including the design of electrodes) to attain its equivalent resistance. When simulating the electrodes, several parameters were taken into account e.g. the size, length, displacement, and position of the electrodes. The size of the electrodes was found to be important. Different designs of sizes can lead to different characterization results of sensor performance, according to various example embodiments.

For the design of "electrodes in sensor" which refers to the case that the sensor has a larger surface area than the electrodes, in addition to the length and displacement of the electrodes, other factors like the position of the electrodes, and dimension of the sensor, will also effect the resistance of the sensor (see FIG. 6a). In FIG. 6a, the lager surface area of the sensor is illustrated by the length of electrodes e.g. 600 within the sensor resistance network 602 being shorter than the corresponding length 604 of the sensor resistance network 602.

However, for the design of "sensor in electrodes" which refers to the case that electrodes have a larger surface area than sensor, only the displacement and length of electrodes was found to affect the resistance within expectation (see FIG. 6b). In FIG. 6b, the larger surface area of the electrodes is illustrated by the length of electrodes e.g. 606 within the sensor resistance network 608 being the same as or larger than the length 610 of the sensor resistance network 608. The investigation result can make the circuit more robust during the sensor characterization. Hence, the latter design was selected for preferred embodiments. The resistance increases with the increased displacement of two electrodes, and it reduces with the increased length of electrodes. This phenomenon can further simplify the equivalent circuits to a "m×n" resistance network (see FIG. 7a), where m is proportional to the length of the electrodes and n is proportional to the displacement.

Sensing Mechanisms According to Example Embodiment

Figure 7B:
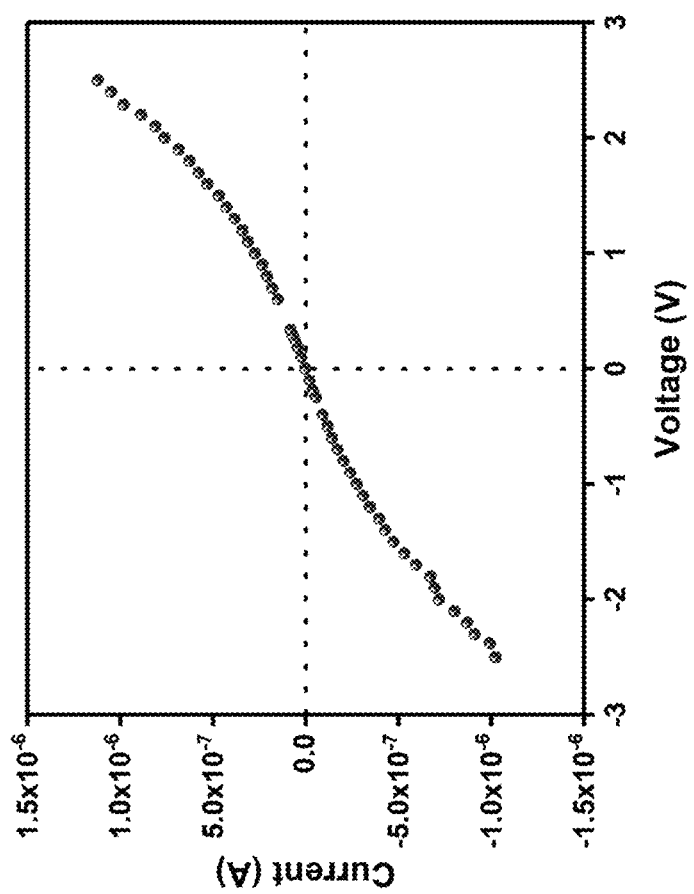
FIG. 7b shows an I-V curve of a graphene sensor according to an example embodiment under applied load of 0 kPa.
Figure 7C:
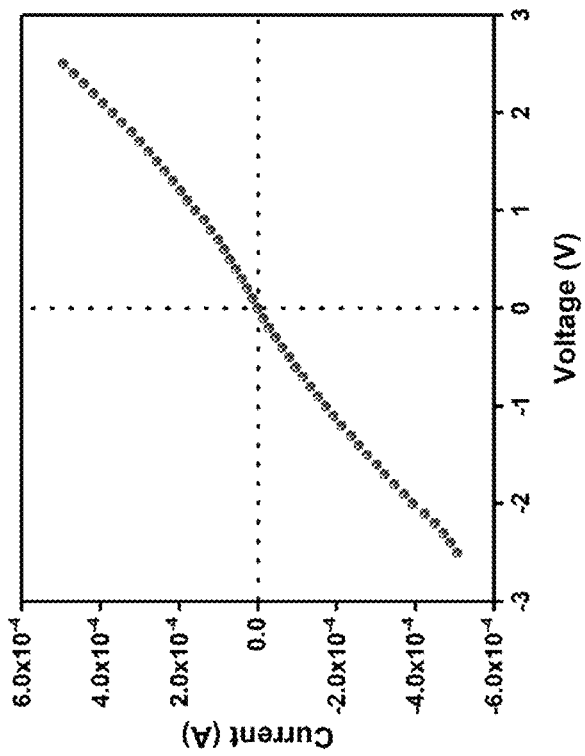
FIG. 7c shows an I-V curve of a graphene sensor according to an example embodiment under applied load of 13.6 kPa.
Figure 7D:
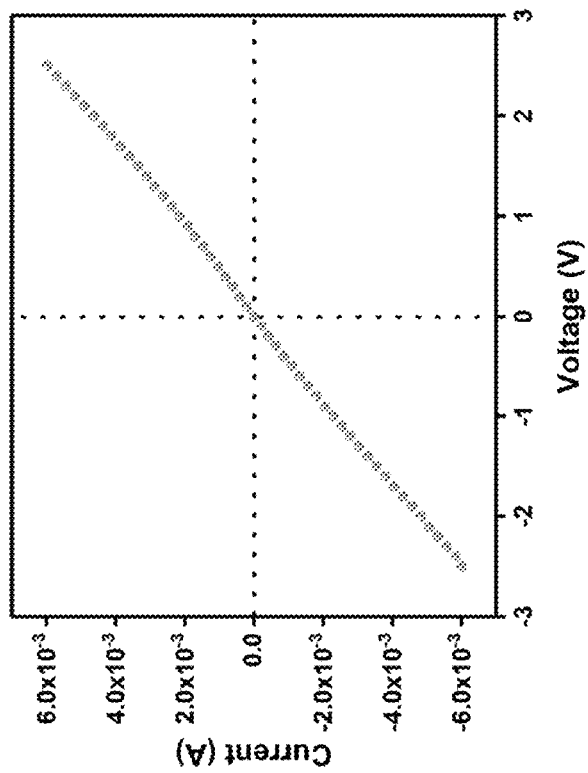
FIG. 7d shows an I-V curve of a graphene sensor according to an example embodiment under applied load of 26.6 kPa.

FIGS. 7b-d shows I-V curves of a graphene sensor according to an example embodiment under different applied loads (0 kPa, 13.6 kPa, and 26.6 kPa, respectively). The non-linear relationship indicates the quantum tunneling effect in the sensor according to the example embodiment.

With reference to FIG. 1b, when the Gr-GO/PDMS composite is assembled with electrodes to form the sensor 120 according to an example embodiment, one pair of interdigital electrodes 116, 118 is used for the testing. The interdigital electrodes 116, 118 consist of two interlocking comb-shaped arrays of metal, whereby the electrodes 116, 118 are co-located adjacent to each other on the same surface of the substrate. The current will flow from one electrode 116, passing through the Gr-GO coating on the surface of the microstructures, e.g. micropyramids, and then into the other electrode 118. The total resistance of the sensor according to example embodiments is contributed by three parts: electrodes resistance ($R_e$), contact resistance ($R_c$), and surface resistance of Gr layer ($R_s$). $R_e$ does not change with pressure. $R_c$ significantly changes with pressure mainly due to the change of contact area and also due to some quantum tunneling effects from stacked graphene flakes. $R_s$ slightly changes with pressure due to the change of surface area during compression, but this change is minuscule compared with the change of $R_c$.

The simplified circuit is shown in FIG. 7a. $R_s$ is regarded as the aggregation of the resistor network with approximated constant resistance. $R_c$ is the aggregation of microstructures, here micropyramids which are contacted with electrodes and having a pressure-induced resistance change. Each micropyramid is regarded to have the same resistance, as well as the same resistance change during loading. The number k is related to the area of electrodes, and also the density of micropyramids. FIGS. 7b to 7d illustrate the I-V curves of a graphene sensor according to an example embodiment under different applied loads (0 kPa, 13.6 kPa, and 26.6 kPa, respectively). The resistance decreases with the increase of the applied voltage, indicating the quantum tunneling effect existing in the graphene sensors according to example embodiments. The tunneling effect comes from the nano-scale gaps between graphene flakes. Because the distance of each gap will be reduced with creased pressure the tunneling effect will get attenuated during the compression at higher pressure. This is revealed in FIGS. 7b to 7d, through the reduced nonlinearity of I-V relationships observed when the pressure increases.

Sensor Demonstration According to Example Embodiments

Figure 8:
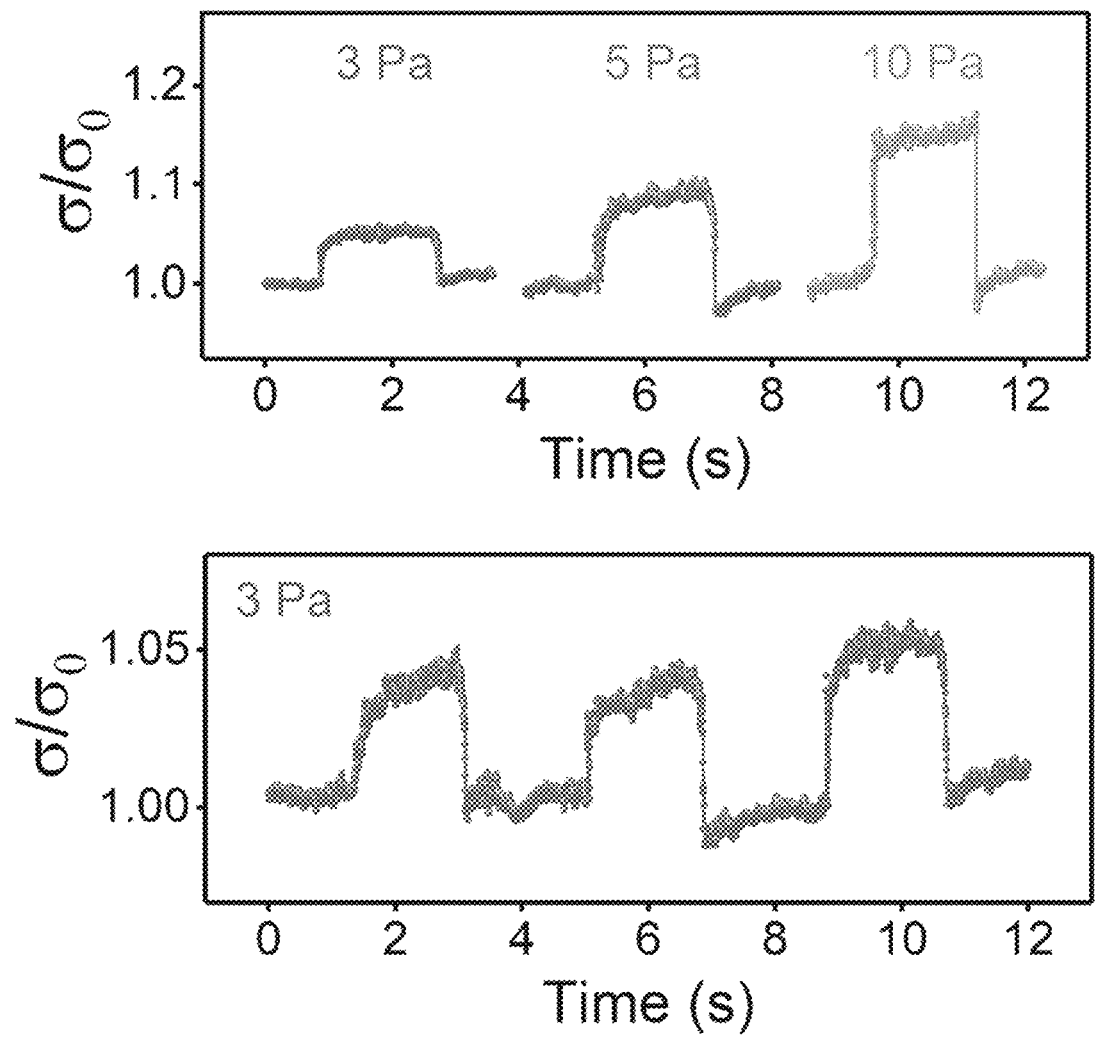
FIG. 8 shows an upper graph illustrating the continuous detection of varying small weights by a sensor according to example embodiments and a lower graph illustrating the continuous detection of the same small weight by a sensor according to example embodiments.

FIGS. 8a and 8b illustrate the continuous detection of small weights by sensors according to example embodiments. Specifically, as the graphene sensors according to example embodiments can sense the tactile pressure sensitively and stably, an experiment of continuous detection of small weights was carried out. The sensor with a dimension of 6 mm×6 mm according to an example embodiment was fabricated to detect small weights of 100 mg, 50 mg and 30 mg. The minimum pressure corresponded to around 8 Pa. As shown in FIG. 8a, the sensor according to an example embodiment can continuously detect these small weights with good stability for a duration of around 3 s. As shown in FIG. 8b, the sensor according to an example embodiment is able to output a consistent resistance change for the same small, indicating its good ability to sustainably sense ultrasmall tactile signals. From previous studies, the touch receptors on human fingertips can sense pressure with a rough range of 100 Pa to 100 kPa. Compared with such a requirement, the sensors according to example embodiments have good potential to be utilized in electronic skin, exhibiting a sensing range from 8 Pa to 140 kPa in one example embodiment.

In addition to a wide sensing range, a high time resolution is also desired for a tactile sensor, which refers to the ability to distinguish signals with high frequencies, e.g. vibration. In nature, the protein fiber spun by spiders exhibits a unique combination of high tensile strength and good extensibility. The network structure using these spider silks contributes to the excellent vibration detection function of a spider web. For sensors according to example embodiments, graphene also has a very high modulus and owns certain flexibility simultaneously, similar with the spider web in terms of both structure and properties. Owing to these similarities, a fast time response is advantageously exhibited by graphene sensors according to example embodiments, providing for the ability to detect high frequencies. Thus, the sensors according to example embodiments are capable of recognizing a great time resolution to the tactile pressure, which can be applied to detect the vibration.

Figure 9A:
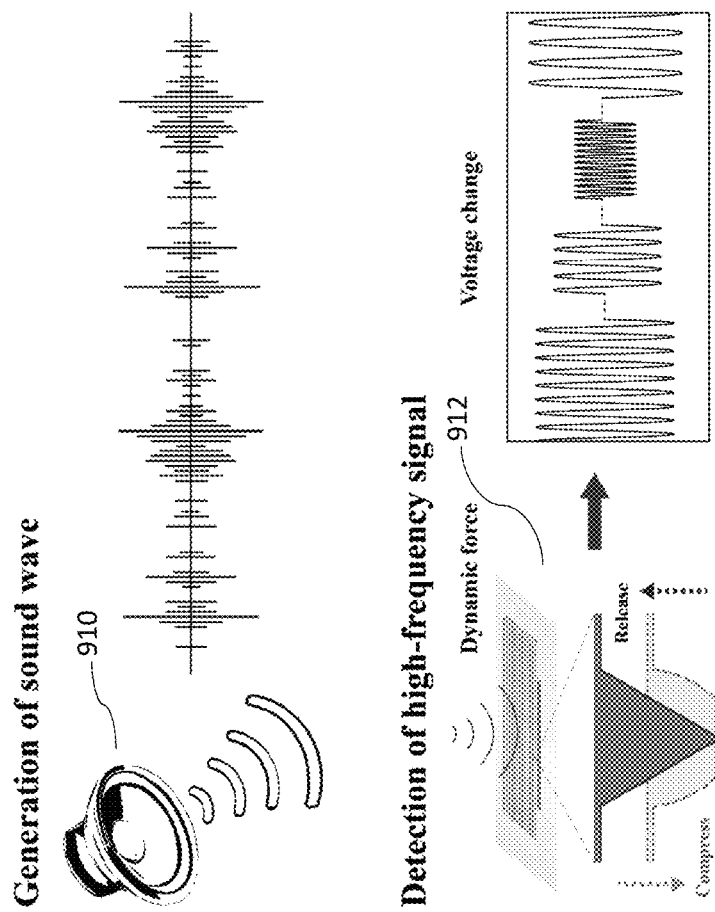
FIG. 9a shows a schematic representation of a setup for the detection of vibration using a graphene sensor according to an example embodiment.
Figure 9B:
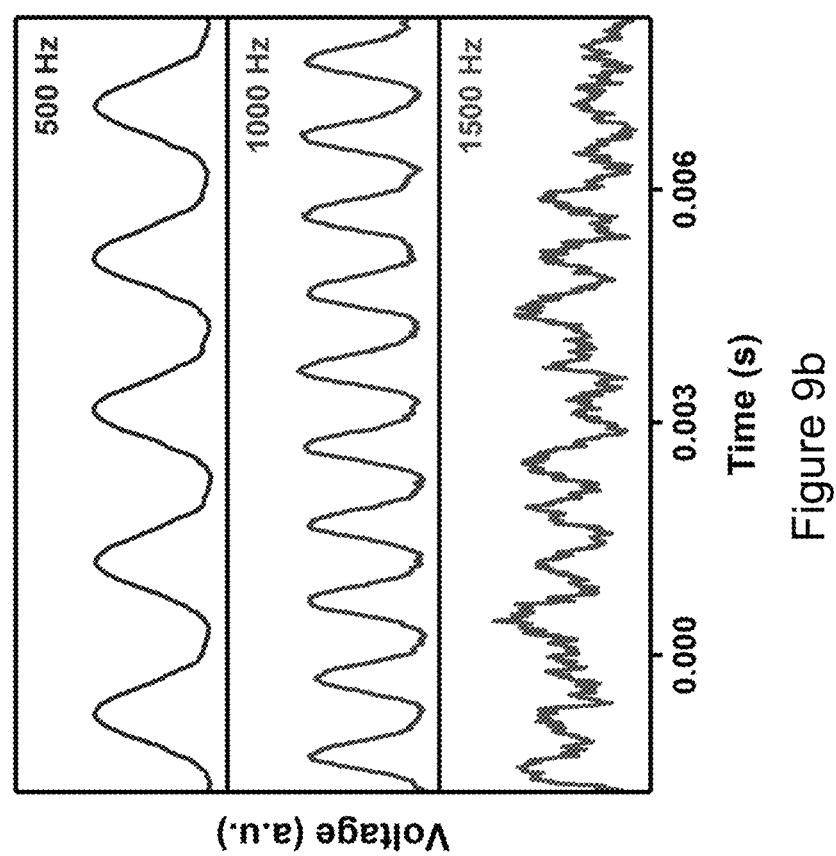
FIG. 9b shows a graph illustrating the detection results using a graphene sensor according to an example embodiment of dynamic forces with frequencies of 500 Hz, 1000 Hz and 1500 Hz.
Figure 9C:
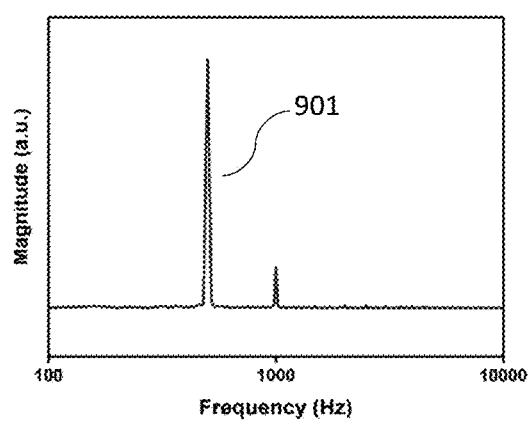
FIG. 9c shows the Fast Fourier Transform (FFT) of the detection results using a graphene sensor according to an example embodiment of dynamic forces with frequencies of 500 Hz.
Figure 9D:
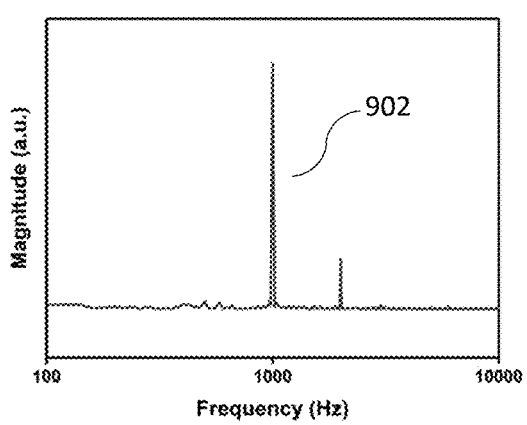
FIG. 9d shows the Fast Fourier Transform (FFT) of the detection results using a graphene sensor according to an example embodiment of dynamic forces with frequencies of 1000 Hz.
Figure 9E:
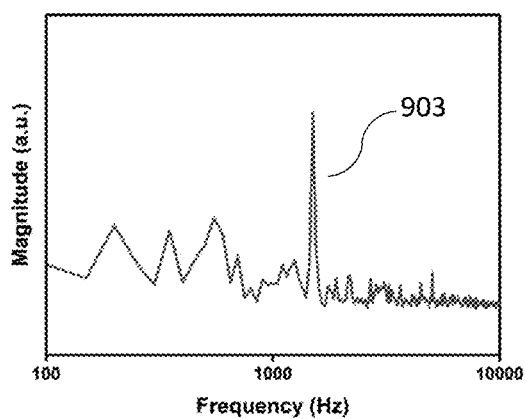
FIG. 9e shows the Fast Fourier Transform (FFT) of the detection results using a graphene sensor according to an example embodiment of dynamic forces with frequencies of 1500 Hz.

FIG. 9a shows a schematic representation of a setup for the detection of vibration using a graphene sensor according to an example embodiment. Acoustic wave was utilized to generate dynamic forces with high frequencies. FIG. 9b shows a graph illustrating the detection results of dynamic forces with frequencies of 500 Hz, 1000 Hz and 1500 Hz. FIGS. 9c to 9e shows the Fast Fourier Transform (FFT) of the respective detection results in FIG. 9b, showing the corresponding frequencies 901-903 that the sensor detected.

With reference to FIG. 9a, in order to provide the high-frequency signal in an experimental setup, a speaker 910 was utilized to generate the acoustic wave with custom-adjustable frequency. The acoustic wave was vertically applied on the surface of a sensor 912 according to an example embodiment to induce a dynamic force. Once the sensor 912 receives the dynamic force, it will be expeditiously compressed and released to correspondingly give a dynamic electrical response. As the graphene sensor 912 according to an example embodiments has a frequency-independent pressure response, the different frequencies will not affect the amplitude of sensor response. This property is beneficial for the detection of vibration and the accurate recognition of frequency without bringing in other factors. The sensor 912 according to an example embodiment was shown to be able to detect the vibration with a high frequency of at least 1500 Hz. FIG. 9b gives the detection results of the vibration with frequencies of 500 Hz, 1000 Hz and 1500 Hz. By using the fast Fourier transform (FFT) algorithm to analyze the electrical response through the sensor output, the frequency of vibration can be recognized. FIGS. 9c to 9e illustrate the FFT analysis results of these signals (500 Hz, 1000 Hz and 1500 Hz, respectively).

In one embodiment, a composite structure for a pressure sensor is provided, the composite structure comprising an array of microstructures made from an elastomeric material; and a flexible conductive coating formed on the array of microstructures such that a surface morphology of the array of microstructures is substantially maintained for the coated array of the microstructures; wherein the conductive coating exhibits a Young's modulus that is higher than that of the elastomeric material.

The Young's modulus may be about one order of magnitude higher than that of the elastomeric material, or more.

The flexible conductive coating may comprise a low dimensional electronically active material system. The low dimensional electronically active material system may exhibit electron tunneling properties.

The low dimensional electronically active material system comprises a uniform layer.

The low dimensional electronically active material system may comprise 2D material structures. The 2D material structures may comprise nanoflakes.

The composite structure may further comprise a substrate for the array of microstructures.

The composite structure may further comprise an intermediate layer between the array of microstructures and the flexible conductive coating for improved uniformity of the flexible conductive coating.

In one embodiment, a pressure sensor comprising the composite structure of the above embodiment is provided.

The pressure sensor may exhibit a reduced hysteresis based on elastic properties of the composite structure compared to viscoelastic properties of the elastomeric material of the array of microstructures.

The pressure sensor may exhibit a substantially frequency independent pressure response.

The pressure sensor may exhibit a substantially temperature independent pressure response.

The pressure sensor may exhibit a substantially humidity independent pressure response.

The pressure sensor may further comprise electrodes disposed on the coated array of microstructures for measuring a resistance of an electric path comprising a portion of a surface of the coated array of microstructures. The electrodes may comprise two interdigital electrodes.

The resistance may change as a result of compression of the coated array of microstructures under a pressure. The resistance may decrease with increasing pressure.

Figure 11:
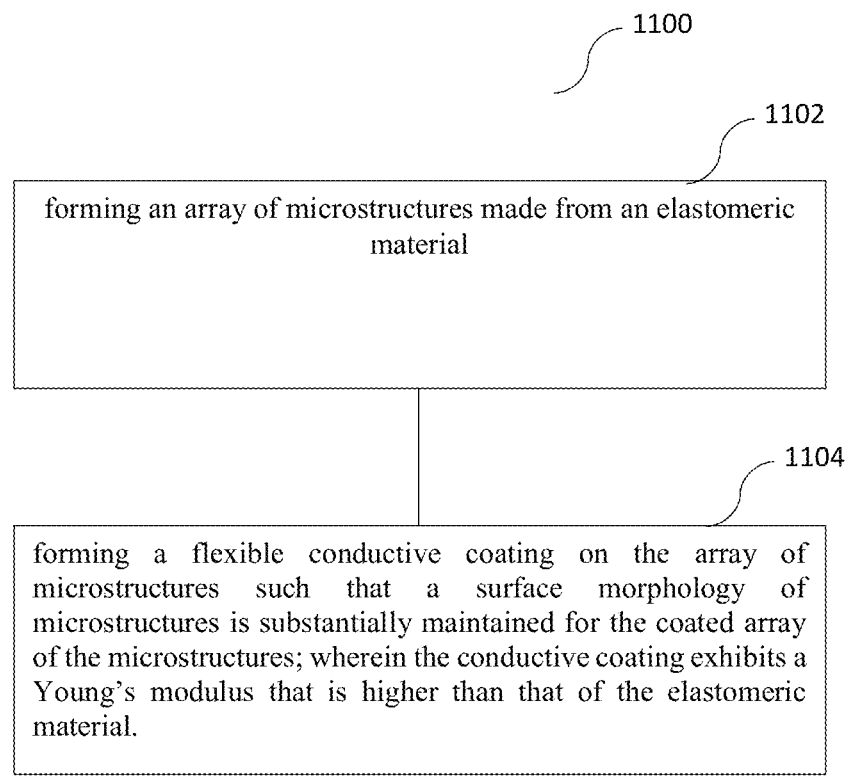
FIG. 11 shows a flowchart 1100 illustrating a method of fabricating a composite structure for a pressure sensor, according to an example embodiment.

FIG. 11 shows a flowchart 1100 illustrating a method of fabricating a composite structure for a pressure sensor, according to an example embodiment. At step 1102, an array of microstructures made from an elastomeric material is formed. At step 1104, a flexible conductive coating is formed on the array of microstructures such that a surface morphology of microstructures is substantially maintained for the coated array of the microstructures, wherein the conductive coating exhibits a Young's modulus that is higher than that of the elastomeric material.

Forming the flexible coating may comprises drop casting a first material onto the array of microstructures.

The method may comprise blading a second material onto the array of microstructures prior to drop casting the first material.

The first material may comprise a low dimensional electronically active material system.

The low dimensional electronically active material system may exhibit electron tunneling properties.

The low dimensional electronically active material system may comprise a uniform layer.

The electronically active material system may comprise 2D material structures. The 2D material structures may comprise nanoflakes.

The method may further comprise disposing electrodes on the coated array of microstructures for measuring a resistance of an electric path comprising a portion of a surface of the coated array of microstructures.

In one embodiment, a method of pressure sensing using the pressor sensor of the above embodiment is provided.

Embodiments of the present invention can have one or more of the following features and associated benefits/advantages:

| Feature | Benefit/Advantage |
| --- | --- |
| 1. Fast and easy fabrication | The fabrication method is fast and easy. Large-scale fabrication of sensor array can be achieved. |
| 2. Wide pressure detection range | The sensor is able to demonstrate a wide sensitive range of at least 140 kPa. This wide range can satisfy the pressure sensing ability required by fingers. |
| 3. Low hysteresis | The sensor can identically detect the pressure regardless the loading and unloading process, which improves the accuracy of sensing ability. |
| 4. High reliability and durability | The sensor is highly reliable and tested at least 1,000,000 cycles, without inducing a significant change in pressure response and hysteresis. |
| 5. Environment temperature, humidity and strain rate independence | The sensor performance is independent of temperature, humidity and strain rate, providing a reliable sensing ability at different ambient conditions. |
| 6. Tunable sensing ability | The pressure response of the sensor can be tunable by changing the times of coating, as well as the concentration of graphene. |
| 7. Detection of small pressure | The sensor is capable of detecting small pressures of less than 10 Pa, which is comparable with the sensing ability of fingers. |
| 8. Fast response | The sensor can detect pressure with a high time resolution. The fast response of sensor can make it detect signals with high frequencies of at least 1500 Hz. |

Embodiments of the present invention can have the following applications, by way of example, not limitation:
- A highly sensitive pressure sensor for the long-term detection of pulses and other health-monitoring applications
- Electronic skin for the detection of both pressure and vibration Aspects of the systems and methods described herein, such as the signal processing of the electrical signals, may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

In general, in the following claims, the terms used should not be construed to limit the systems and methods to the specific embodiments disclosed in the specification and the claims, but should be construed to include all processing systems that operate under the claims. Accordingly, the systems and methods are not limited by the disclosure, but instead the scope of the systems and methods is to be determined entirely by the claims.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

REFERENCES

1. Sun, Q. et al. Fingertip-Skin-Inspired Highly Sensitive and Multifunctional Sensor with Hierarchically Structured Conductive Graphite/Polydimethylsiloxane Foams. 1808829, 1-11 (2019).

2. B. C. K. Tee, A. Chortos, R. R. Dunn, G. Schwartz, E. Eason, Z. Bao, Adv. Funct. Mater. 2014, 24, 5427.

The invention claimed is:

1. A composite structure for a pressure sensor, the composite structure comprising:
   an array of microstructures made from an elastomeric material; and
   a flexible conductive coating formed on the array of microstructures such that a surface morphology of the array of microstructures is substantially the same as for the coated array of the microstructures;
   wherein the flexible conductive coating exhibits a Young's modulus that is higher than that of the elastomeric material;
   wherein the flexible conductive coating comprises a low dimensional electronically active material formed on an intermediate uniform layer between the array of microstructures and the low dimensional electronically active material; and
   the composite structure further comprising electrodes disposed on the coated array of microstructures and configured for measuring a change in contact resistance between the low dimensional electronically active material and the electrodes as a result of pressure on the composite structure.

2. The composite structure of claim 1, wherein the Young's modulus of the conductive coating is about one order of magnitude higher than that of the elastomeric material, or more.

3. The composite structure of claim 1, wherein the flexible conductive coating comprises an electronically active material exhibiting electron tunneling properties.

4. The composite structure of claim 3, wherein the electronically active material comprises a uniform layer or nanoflakes.

5. The composite structure of claim 1, further comprising a substrate for the array of microstructures.

6. A pressure sensor comprising the composite structure of claim 1.

7. The pressure sensor of claim 6, exhibiting a reduced hysteresis based on elastic properties of the composite structure compared to viscoelastic properties of the elastomeric material of the array of microstructures.

8. The pressure sensor of claim 6, exhibiting a substantially frequency independent output as a function of applied pressure.

9. The pressure sensor of claim 6, exhibiting a substantially temperature independent output as a function of applied pressure.

10. The pressure sensor of claim 6, exhibiting a substantially humidity independent output as a function of applied pressure.

11. The pressure sensor of claim 6, wherein the electrodes are disposed on an opposite side of the flexible conductive coating compared to the array of microstructures.

12. The pressure sensor of claim 11, wherein the flexible conductive coating comprises an electronically active material exhibiting electron tunneling properties.

13. The pressure sensor of claim 11, wherein the electrodes comprise two interdigital electrodes.

14. A method of pressure sensing using the pressure sensor of claim 6.

15. A method of fabricating a composite structure for a pressure sensor, the method comprising the steps of:

forming an array of microstructures made from an elastomeric material; and forming a flexible conductive coating on the array of microstructures such that a surface morphology of microstructures is substantially the same as the coated array of the microstructures;

wherein the flexible conductive coating exhibits a Young's modulus that is higher than that of the elastomeric material; and wherein forming the flexible conductive coating comprises forming an intermediate uniform layer on the array of microstructures and providing a low dimensional electronically active material on the intermediate uniform layer;

the method further comprising disposing electrodes on the coated array of microstructures and configured for measuring a change in contact resistance between the low dimensional electronically active material and the electrodes as a result of pressure on the composite structure.

16. The method of claim 15, wherein forming the flexible coating comprises drop casting the low dimensional electronically active material onto the intermediate uniform layer.

17. The method of claim 16, comprising blading the intermediate uniform layer onto the array of microstructures prior to drop casting the low dimensional electronically active material.

18. The method of claim 15, wherein the flexible conductive coating comprises an electronically active material exhibiting electron tunneling properties.

19. The method of claim 18, wherein the electronically active material comprises a uniform layer or nanoflakes.

20. The method of claim 15, further comprising disposing electrodes on an opposite side of the flexible conductive coating compared to the array of microstructures.

* * * * *